(12) United States Patent
Green

(10) Patent No.: US 7,071,256 B2
(45) Date of Patent: Jul. 4, 2006

(54) POLYMER COMPOSITION

(75) Inventor: Michael Green, Huddersfield (GB)

(73) Assignee: Ciba Specialty Chemicals Water Treatments LTD, Bradford (GB)

(*) Notice: Subject to any disclaimer, the term of this patent is extended or adjusted under 35 U.S.C. 154(b) by 24 days.

(21) Appl. No.: 10/479,943

(22) PCT Filed: Jun. 17, 2002

(86) PCT No.: PCT/EP02/06634

§ 371 (c)(1),
(2), (4) Date: Dec. 4, 2003

(87) PCT Pub. No.: WO03/002624

PCT Pub. Date: Jan. 9, 2003

(65) Prior Publication Data

US 2004/0157981 A1 Aug. 12, 2004

(30) Foreign Application Priority Data

Jun. 29, 2001 (GB) .................. 0115902.9
Jul. 4, 2001 (GB) .................. 0116309.6

(51) Int. Cl.
*C08K 5/01* (2006.01)

(52) U.S. Cl. .............. 524/474; 524/267; 524/306; 524/315; 524/475; 524/801

(58) Field of Classification Search ........... 524/267, 524/801, 474–475, 306–318
See application file for complete search history.

(56) References Cited

U.S. PATENT DOCUMENTS

| 3,637,615 A | * | 1/1972 | Coffman ............... 428/355 AC |
| 4,171,296 A | | 10/1979 | Connelly et al. ........... 524/608 |
| 4,230,608 A | | 10/1980 | Mura ........................ 523/337 |
| 5,021,526 A | | 6/1991 | Ball ........................ 526/240 |
| 5,292,800 A | | 3/1994 | Moench et al. ............. 524/801 |
| 5,412,035 A | * | 5/1995 | Schmitt et al. ............. 525/93 |
| 5,475,047 A | | 12/1995 | Abraham et al. ........... 524/436 |
| 5,721,313 A | | 2/1998 | Yeung et al. ............... 524/814 |
| 2004/0065232 A1 | | 4/2004 | Lykke ........................ 106/680 |

FOREIGN PATENT DOCUMENTS

| DE | 3730781 | 3/1989 |
| EP | 0172025 | 2/1986 |
| EP | 0427107 | 5/1991 |
| FR | 2693202 | 1/1994 |
| GB | 2269178 | 2/1994 |

OTHER PUBLICATIONS

Derwent Abstract 1989-094530 [13] for DE 3730781 (1989).

* cited by examiner

*Primary Examiner*—Peter Szekely
(74) *Attorney, Agent, or Firm*—Shiela A. Loggins

(57) ABSTRACT

A polymer composition which comprises a continuous phase comprising a water immiscible liquid and a dispersed phase comprising a polymer of an N-substituted acrylamide and ethylenically unsaturated acid or salt and optionally a cross-linking agent. The polymer composition is preferably used in an aqueous cleaning composition for improving the rheology characteristics. The polymer composition is preferably used in an adhesive composition for a dressing to be applied to animal or human skin.

12 Claims, No Drawings

POLYMER COMPOSITION

This invention relates to novel polymer compositions of substituted acrylamides with ethylenically unsaturated carboxylic acids. The invention also relates to aqueous compositions comprising said polymer compositions as rheology modifiers. The aqueous compositions are in particular aqueous cleaning compositions, especially for hard surfaces. The invention further relates to adhesive compositions comprising said polymer compositions, in particular adhesives used in dressings applied to human or animal skin.

It is known to use polymeric additives in order to modify the rheology of various aqueous compositions, for instance aqueous emulsion paints, print pastes, fabric conditioners and aqueous cleaning liquids. In aqueous compositions such as cleaning compositions it is common practice to include abraisive particles. Desirably such compositions have a so-called "plastic" rheology whereby the composition is thickened in order to maintain the abrasive particles in suspension, but remains flowable without the need for excessive shaking or agitation.

Thickened aqueous cleaning compositions are known, having been taught in U.S. Pat. No. 3,843,548; U.S. Pat. No. 3,558,496; U.S. Pat. No. 3,684,722; U.S. Pat. No. 4,005,027; and U.S. Pat. No. 4,116,851.

The use of bleaches in cleaning housewares is known, having been taught in U.S. Pat. No. 3,928,065; U.S. Pat. No. 3,708,429; U.S. Pat. No. 3,058,917; and U.S. Pat. No. 3,671,440.

The use of polycarboxylate polymers in cleaning compositions is known, as disclosed in U.S. Pat. No. 3,060,124; U.S. Pat. No. 3,671,440; U.S. Pat. No. 4,392,977; U.S. Pat. No. 4,147,650; and U.S. Pat. No. 4,836,948; GB-A-1527706; and GB-A-2203163.

AU-B-710976 addresses the problem in formulating compositions including abrasive particles wherein the particles are retained in suspension in the composition during storage but the viscosity is lowered on pouring or expelling the composition from the bottle in which it is stored. The composition disclosed comprises: i) a polymeric water-soluble thickener ii) a bleaching agent iii) abrasive particles, and iv) a colloid-forming component, in particular a clay, with the balance being water and optional minor ingredients, such as perfumes and dyes. The polymeric thickener is said to interact with the colloid forming clay. In particular, it is believed that the polymeric chains of the polymeric thickener may occupy voids in the clay structure. Traditional polymeric thickeners are proposed, including copolymers of acrylic acid, such as Acusol (RTM).

U.S. Pat. No. 5,346,641 describes a thickened aqueous abrasive scouring cleanser containing bleach comprising and aqueous solution containing a colloidal aluminum oxide thickener having average particle size of no greater than about one micron; at least one surfactant which can, in association with the aluminum oxide, provide proper rheology and cleaning; an electrolyte/buffer to promote the environment in which the aluminum oxide and surfactant can associate to provide proper rheology; a halogen bleach; a particulate abrasive having average particle size of about 40 to 800 microns to provide scouring action; and a viscosity stabilizing amount of a multivalent metal salt.

U.S. Pat. No. 4,287,079, relates to a clay/silicon dioxide thickened, bleach-containing abrasive cleanser which could contain an anionic surfactant. Due to the clay-thickened rheology, cleansers of this sort quickly dry out and set up. While these type of cleansers thus become less flowable over time, they are unfortunately also plagued by significant syneresis problems.

U.S. Pat. No. 3,956,158 shows an abrasive-containing bleach thickened with insoluble detergent filaments.

U.S. Pat. No. 4,240,919 describes a liquid abrasive scouring cleanser with a thixotropic rheology and discloses a multivalent stearate soap to provide the thixotropic rheology.

U.S. Pat. No. 4,657,692 is concerned with providing hard surface cleaners which have efficacy against a variety of soils and stains. A hard surface abrasive scouring cleanser comprising a colloidal aluminum oxide thickener having average particle size, in dispersion, of no greater than about 1 micron, an electrolyte/buffer to promote the environment in which the colloidal aluminum oxide and surfactant can associate to provide proper rheology; at least one surfactant which can, in association with the aluminum oxide, provide proper rheology and cleaning; a halogen bleach; and a particulate abrasive having average particle size of about 1 to 400 microns to provide scouring action.

EP-A-0421738 relates to liquid cleaning compositions incorporating a chlorine bleach ingredient, cross-linked polycarboxylate polymers, a rheology stabilizing agent, and a buffering agent, and which display enhanced physical stability in the presence of bleach. The compositions disclosed are liquid cleaning compositions comprising, a chlorine bleach ingredient; from about 0.1% to about 10% of a cross-linked polycarboxylate polymer thickening agent; from about 0.05% to about 5% of a rheology stabilizing agent; and sufficient alkalinity buffering agent to provide said composition with a pH greater than about 10. The rheology modifier is a cross-linked polycarboxylate polymer thickening agent. This polymer preferably is said to have a molecular weight of from about 500,000 to about 5,000,000, more preferably from about 750,000 to about 4,000,000. The polymer is an interpolymer of a monomeric mixture comprising a monomeric olefinically unsaturated carboxylic acid, and from about 0.1% to about 10% by weight of the total monomers of a polyether of a polyhydric alcohol, which polyhydric alcohol contains at least four carbon atoms to which are attached at least three hydroxyl groups, the polyether containing more than one alkenyl group per molecule. Other monoolefinic monomeric materials may be present in the monomeric mixture if desired, even in predominant proportion. Carboxyvinyl polymers are substantially insoluble in liquid, volatile organic hydrocarbons and are dimensionally stable on exposure to air.

WO-A-9738076 addresses the object of providing a cleaning compositions having a non-runny viscosity, that can also be readily wiped off a surface, sprayed through a conventional trigger sprayer, and provide substantially streak-free cleaning of a surface. The composition proposed comprises standard synthetic polymers having high thickening efficiency include, but are not limited to, polyacrylic acid polymers available under the tradenames Acritamer 501E (RTM). The compositions include certain glycol ethers, nonionic surfactants, and linear alcohols, when combined with an anti-streaking alcohol, couple with the synthetic polymer and markedly increase the viscosity of glass cleaning compositions, provide substantially streak-free cleaning and reduce the rub-out friction of glass cleaning compositions.

Despite all of the developments in rheology modification there exists a need for a rheology modifier that provides improved plastic rheology. In parliclular there is a need for an improved rheology modifier that maintains the abrasive particles in suspension, but remains flowable without the need for excessive shaking or agitation.

It is also known to use certain pressure sensitive adhesive polymers for medical dressings for synthetic polymers. Generally medical pressure-sensitive adhesive masses having a high MVT (moisture vapour transmission) and a high adhesive force on skin that is moist owing to heavy perspiration have been known for some time. However, these pressure-sensitive adhesive masses have some disadvantages limiting their practical use to a great extent.

U.S. Pat. No. 5,057,179 describes a polar dispersion based on polyvinyl acetate, which has a good adhesion to moist substrates.

JP-A 31 62473 describes a pressure-sensitive adhesive mass with adhesion to moist surfaces. This pressure-sensitive adhesive mass consists of an acrylate copolymer built-up of alkyl acrylate, alkylene alkoxyacrylate, and vinylcarboxylic acid, and an ethylene vinyl acetate copolymer.

JP-A 30068672 includes adhesive tapes for medical patches adhering to moist or dry skin. These products comprise silicone pressure-sensitive adhesive masses and water-soluble carboxyvinyl polymers, cellulose derivatives or starch derivatives.

JP-A 62091577 describes pressure-sensitive adhesive masses with a marked adhesion to dry and moist substrates, the adhesion to moist substrates being achieved by introduction of water absorbing agents based on cross-linked polyacrylate salts.

JP-A 61290956 describes resins for medical pressure-sensitive adhesive masses composed of acrylamide derivatives, (meth)acrylates, and glycol acrylic-acid esters.

WO 84013837 describes pressure-sensitive adhesive masses especially suitable for moist skin; these are based on copolymers of hydrophobic acrylates, hydrophobic vinyl polyethers, and polar monomers. (Meth)acrylic acid, itaconic acid, (meth)acrylamide, or n-vinyl pyrrolidone are used as a polar monomer.

GB-A 2070631 describes copolymers of butyl acrylate, ethylhexyl acrylate, and acrylic acid, for the use in medical products. In addition of cohesive properties, these copolymers have an adhesion to dry and moist skin and a vapor permeability of more than 300 g/m@2/24.h.

The prior art includes pressure-sensitive adhesive masses of differing compositions; they adhere to dry and moist skin but their adhesive power in case of heavy perspiration is reduced to such an extent that they cannot be used for patches.

The physiological acceptability of the employed raw materials has been of major importance in many pressure-sensitive adhesive masses classified as being suitable for medical purposes; but the MVT in adhesive medical products, also called breathability, has been left out of consideration. However, this is important for both protection of the skin from maceration, which results from moisture accumulation under the adhesive mass, and permanent adhesion to the skin, which is also impaired by moisture accumulation.

WO0108619 concerns the desire for a thin, breathable film that can be applied to a wound in an easy and efficient manner. This reference describes a conformable adhesive article. The article is said to be suitable for use as a sterile medical dressing, and includes a breathable polymeric matrix, a plurality of phases, and an adhesive composition positioned on or within at least a portion of the polymeric matrix. The pressure-sensitive adhesives said to be useful include tackified natural rubbers, tackified synthetic rubbers, tackified styrene block copolymers, self-tacky or tackified acrylate or methacrylate copolymers, self-tacky or tackified poly-a-olefins, and self-tacky or tackified silicones.

U.S. Pat. No. 5,785,985 attempts to provide polymers with high MVTs of at least 300 g/m@2/24 h. The adhesive composition comprises A) a copolymer of 50 to 95% by weight of one or several alkyl esters of acrylic and/or methacrylic acid having 4 to 12 C-atoms in the alkyl residue and 5 to 50% wt., preferably 10 to 30% wt. of a vinylcarboxylic acid, relative to the copolymer in combination with B) 25 to 90% wt., preferably 50 to 80% wt. of a hydrophilic emulsifier comprising tertiary or quatemary ammonium groups; C) 15 to 60% wt., preferably 20 to 40% wt. of a hydrophilic, polyoxyalkylene groups-containing emulsifier which is free from amino groups; D) 1 to 20% wt., preferably 3 to 15% wt. of a polyvinylcarboxylic acid; E) 1 to 15% wt., preferably 3 to 10% wt. of a tackifying resin, and F) 0.05 to 5% wt., preferably 0.1 to 2% wt. of a cross-linking agent.

EP-A-501124 describes a water vapor permeable, pressure sensitive adhesive composition comprising a hydrophilic, all acrylic polymer system, free of additives and having enhanced water vapor transmission which contains a significant high amount of hydroxyalkyl acrylate/methacrylate. This adhesive composition is particularly useful in surgical or medical dressing applications.

EP-A-0 476 963 discloses polymeric blends comprising a mixture of a) a hydrophilic block poly(ether-co-amide) containing between about 20 percent and about 80 percent by weight of poly(ethylene glycol) blocks, and b) a hydrophobic polymer. The hydrophobic polymer may be a block poly(ether-co-amide) containing no poly(ethylene glycol) blocks, a polyamide, a polyester or a polyurethane.

EP-A-0560630 describes a nonporous, breathable bicomponent film which comprises two major layers of polymeric materials. These two major layers are normally co-extensive in length and width but, as will be seen, have different thicknesses. The second major layer of polymeric material provides resistance to aqueous alcohol solutions. In this system the first of the two major layers of polymeric material comprising the bicomponent film of the present invention includes a) a hydrophilic block poly(ether-co-amide) which contains between about 20 and about 80 percent by weight of polyethylene glycol (PEG) blocks and b) a hydrophobic polymer which may be a block poly(ether-co-amide) containing essentially no PEG blocks, a polyamide, a polyester or a polyurethane. EP-A-693290 concerns the use of the matrix of a hydrocolloid dressing as a topical haemostatic agent which matrix comprises at least one hydrocolloid selected from polyvinyl alcohol, pectin, gelatin, carboxymethyl cellulose (CMC) and NaCMC in a adhesive elastomer lattice. The reference also describes the use of the hydrocolloid component as an adhesive elastomer component for use in a dressing for haemorrhagic wounds.

U.S. Pat. No. 5,726,250 describes a covalently crosslinked absorbent graft copolymer is provided comprised of a water-soluble base monomer and a water-soluble or water-dispersible macromer. In a preferred embodiment, the water-soluble base monomer comprises a carboxylic hydroxyalkyl ester monomer and the water-soluble macromer comprises an ethoxylated or propoxylated hydroxyalkyl (meth)acrylate. The covalently crosslinked absorbent graft copolymer exhibits desirable water absorbency and water vapor transmission rates and may be used in a variety of medical applications such as a wound dressing, medical adhesive or biomedical electrode.

U.S. Pat. No. 5,731,387 reveals an ionically-crosslinked absorbent graft copolymer which exhibits pressure sensitive adhesive properties is provided comprised of a hydrophilic and/or hydrophobic base monomer and a water-soluble or water-dispersible macromer. The ionically-crosslinked absorbent graft copolymer exhibits desirable water absorbency and water vapor transmission rates and may be used in a variety of medical applications such as a wound dressing, medical adhesive, or biomedical electrode.

U.S. Pat. No. 5,849,325 describes an adhesive dressing that includes an adhesive composition in the form of a substantially continuous layer on at least a portion of a conformable backing in which the adhesive composition and the backing are selected such that said adhesive dressing has an Inverted Buffered Saline Moisture Vapor Transmission Rate of at least about 9000 g/m@2/24 hrs. The reference states that a preferred adhesive composition is the reaction product of (a) 50 to 80 parts of an acrylic or methacrylic acid ester of a non-tertiary alcohol having between 4 and 14 carbon atoms, inclusive; (b) 10 to 30 parts by weight of a hydrophilic, ethylenically unsaturated monomer; and (c) at least 15 parts by weight (e.g., 15–25 parts by weight) of an ethylenically unsaturated monomer having one or more carboxylic acid groups.

In this reference the adhesive compositions are said to be prepared according to a variety of well-known polymerization techniques, including solution, emulsion, and bulk polymerization. They may be used alone or blended with discrete, crosslinked polymer microspheres. The microspheres are prepared via a free radical suspension polymerization process. They may be solid or hollow, and either tacky or tack-free. The tack-free microspheres can be elastomeric or plastic. The microspheres typically have diameters ranging from about 1 micrometer to about 300 micrometers. The amount of microspheres preferably is between about 1% and about 75% by volume, and is selected to yield a blend having a substantially smooth, exposed surface available for adhesion after applying the adhesive composition to the backing.

U.S. Pat. No. 4,510,197 is concerned with providing an enhanced water vapor permeable, pressure-sensitive adhesive composition for coating onto medical and surgical bandage sheet materials, which incorporates modified acrylic copolymers. The pressure-sensitive adhesive composition comprises a copolymer of n-butyl acrylate, N-vinyl 2-pyrrolidone and acrylic acid.

U.S. Pat. No. 6,153,215 discloses a dressing for dosing one or more medicaments and comprises at least one medicament containing layer and a barrier layer arranged between the medicament containing layer and a release face characterized in that the barrier layer has a continuous hydrophobic phase and a discontinuous hydrophilic phase which is dispersed therein and which is water swellable. This reference describes a medicament which is incorporated in the discontinuous phase is released by liquid activation The hydrophobic phase is composed of a cross-linked polymer optionally containing an adhesive, said hydrophobic phase being preferably composed of an elastomer, a plasticizer for elastomers, a tackifying resin and optionally an oil-based extender as well as an antioxidant. The continuous phase contains a physically cross-linked elastomer in the form of polyisobutylene, one or more styrene olefin styrene block copolymers or ethylene propylene block copolymers. The continuous phase may also comprise a hydrocarbon resin in the form of a polymer or copolymer of cyclopentadiene, dicyclopentadiene, .alpha.-pinene and/or .beta.-pinene; an antioxidant; an oil extender consisting of one or more mineral oils; and an elastomer polar plasticizer.

U.S. Pat. No. 6,171,594 reveals an adhesive agent for application to human or animal skin, preferably for use in connection with ostomy or incontinence appliances, comprises a pressure sensitive adhesive and optionally additives conventionally used in adhesives of this kind and parts of or extracts from Aloe vera. Such adhesive prevents or alleviates skin problems. In this reference when the adhesive absorbs moisture in the form of sweat, secretion from a stoma or a wound or a crack, or urine flowing into an uridoma, it swells and the Aloe vera components being soluble in water are released.

Despite all of the developments in pressure sensitive adhesive compositions for medical dressings there is still a need for an improved composition which exhibits improvements in vapour transmission. It would also be desirable to achieve this with a composition which exhibits improved moisture absorption. Furthermore it would also be desirable to provide such a composition with improved adhesion. Thus it would be desirable to provide a medical dressing adhesive composition which exhibits an improvement in vapour transmission, moisture absorption and adhesion to the skin of the patient.

Thus according to the present invention we provide a polymer composition which comprises a continuous phase comprising a water immiscible liquid and a dispersed phase comprising a water immiscible liquid and a dispersed phase comprising a polymer of an N-substituted acrylamide and ethylenically unsaturated acid or salt and optionally a cross-linking agent.

In accordance with a first aspect of the invention, the polymer composition can be used as a rheology modifier in a cleaning composition that contains abrasive particles. We have surprisingly found that the polymer of the invention provides improved plastic rheology over state of the art rheology modifiers. In particular the compositions maintain adequate viscosity to suspend the abrasive particles and yet on pouring or agitating the effective viscosity of the liquid composition reduces more effectively in order that the composition exhibits excellent flow properties.

In accordance with a second aspect of the invention, the polymer composition can be used to prepared an adhesive composition for affixing a dressing to animal or human skin. We have surprisingly found that the polymer of the invention provides improved vapour transmission and improved adhesion. In addition we have found that the polymers according to the present invention surprisingly exhibit improved moisture absorption characteristics.

Thus we provide a novel polymeric composition which has surprising advantages, with regard to exhibiting improved rheology modifying properties for aqueous liquids, especially cleaning compositions for hard surfaces in accordance with the first aspect of the invention and surprising advantages with regard to exhibiting improved vapour transmission, adhesion and moisture absorbancy properties in adhesive compositions, especially adhesives applied to animal or human skin in accordnace with the second aspect of the invention.

Suitably the amount of N-substituted acrylamide will be at least 1% by weight and frequently at least 10% by weight. As much as 99 weight % may be appropriate in some circumstances, but usually the amount would be up to 90 weight %. Generally it may be desired to employ a polymer which comprises from 10 to 90 weight % N-substituted acrylamide and from 10 to 90 weight % of an ethylenically unsaturated acid or salt and optionally a cross-linking agent. Typically the amounts of N-substituted acrylamide is in the range of 30 to 90 weight % and 10 to 70 weight % of an ethylenically unsaturated acid or salt and optionally a cross-linking agent.

The N-substituted acrylamide component may desirably be straight or branched chain or cyclic N-alkyl- or N,N-dialkyl-substituted acrylamide. Preferably the substituted acrylamide is relatively water soluble i.e it has a solublity in water of at least 5 g per 100 ml water at 25° C. Substituted acrylamides which are particularly suitable are selected from the consisting of N-methyl acrylamide, N-ethyl acrylamide, N-propyl acrylamide, N,N-dimethyl acrylamide, N,N-diethyl acrylamide, N,N-dipropyl acrylamide and diacetone acrylamide. A particularly preferred substituted acrylamide is N,N-dimethyl acrylamide. The amounts of N-alkyl or N,N-dialkyl acrylamide used in the polymer is preferably 50 to 75 weight %, especially around 40 weight %

The ethylenically unsaturated acid monomer may be any suitable monomer that can be copolymerised with the N-substituted acrylamide. Suitably the monomer will be a carboxylic acid monomer. However, it is also possible to use other acid monomer, for instance monomers that carry sulphonic acid groups or phosphonic acid groups although other groups may also be used. Only one acid monomer may be used or it may be useful to use a blend of acid monomers. This may be for instance a blend of carboxylic acid monomers or alternatively could be a blend or carboxylic acid monomers with a sulphonic acid and/or phosphonic acid monomer. The ethylenically unsaturated acid monomer is desirably selected from the group consisting of acrylic acid, methacylic acid, maleic acid, itaconic acid, fumaric acid, allyl sulphonic acid, vinyl sulphonic acid and 2-acrylamido-2-methylpropane sulphonic acid. A particularly preferred carboxylic acid monomer is (meth)acrylic acid, especially acrylic acid. Preferred amounts of carboxylic acid monomer are from 25 to 50% by weight, especially around 60 weight %. The carboxylic acid monomer may be as the free acid but is preferably in the form of a salt of ammonium or an alkali metal. An especially preferred carboxylic acid monomer is sodium acrylate.

The polymer may be prepared in the absence of cross-linking agent to form an essentially uncross-linked polymer. It may be desirable that the polymer is cross-linked. For instance the polymer may be cross-linked by the presence of cross-linking agents during polymerisation or alternatively may be as a result of cross-linking agents being added subsequently. Where the cross-linking agents are added after polymerisation, the cross-linking agents tend to react with functional groups on the polymer. Such cross-linking agents include compounds that contain two or more reactive groups, such as glycidyl or amine etc. The cross-linking may comprise multivalent metals e.g. calcium, aluminium or zirconium etc.

Preferably the crosslinking agent is a multi-ethylenically unsaturated monomer, which is included in the monomer mixture. Typically the crosslinking monomer is selected from the group consisting of methylenebis acrylamide (MBA), tetrallylammonium chloride (TAAC), polyethyleneglycol diacrylate and penta erithritol triacrylate (PETA). The cross-linking monomer may be added in any suitable amount. This may for instance be 1 to 8000 weight ppm, for instance greater than 2 weight ppm and less than 4000 weight ppm. Preferably the amount of cross-linking agent is between 20 and 1000 weight ppm, more preferably 50 ppm to 250 ppm. A preferred cross-linking agent is methylenebis acrylamide.

We have found that rheology charactersitics vapour are increased when the polymer is formed from monomers consisting of N,N-dimethyl acrylamide, (meth)acrylic acid or alkali metal or ammonium salt and optionally a cross-linking agent. We have also found that particularly effective vapour transmission and adhesion properties are increased when the polymer is formed from monomers consisting of N,N-dimethyl acrylamide, (meth)acrylic acid or alkali metal or ammonium salt and optionally a cross-linking agent.

One preferred polymer is based on around 40% by weight of an N-substituted acrylamide and around 60 weight % carboxylic acid monomer. It is particularly preferred when this polymer comprises 50 to 250 ppm cross-linking agent, especially methylenebis acrylamide.

The composition generally comprises particles of polymer below 10 microns, especially below 2 microns. The particle size may be even smaller, for instance if they have been prepared by microemulsion polymerisation the dispersed phase may have volume average particle size below 700 nm, especially below 200 or 100 nm. The dispersed phase may be as low as 30 nm or lower if prepared by microemulsion polymerisation, but generally the particle size is in the order of 80 to 130 nm especially around 100 nm.

The preferred process of preparing the polymer composition comprises the steps of emulsifying into a water immiscible liquid, an aqueous solution of the monomer optionally containing polymerisation initiators and wherein the water immiscible liquid may contain a surfactant of low HLB (hydrophilic lipophilic balance). Generally such a surfactant will have an HLB of below 7, for instance up to 4 or 5.

Preferably the water immiscible liquid may also comprise an amphipathic polymeric stabiliser in addition to a low HLB surfactant.

A suitable stabiliser is desirably formed from a monomer blend comprising a blend of an ethylenically unsaturated hydrophilic monomer and an ethylenically unsaturated hydrophobic monomer. The polymeric stabiliser may be for instance a copolymer of ethylenically unsaturated polycarboxylic acid (including dicarboxylic acid and the anhydrides) such as maleic acid or maleic anhydride. Preferably the stabiliser is a random copolymer of a blend of hydrophobic monomers selected from styrene and alkyl (meth) acrylates and hydrophilic monomers comprising ethylenically unsaturated polycarboxylic acid, i.e. an ethylenically unsaturated monomer containing a multiplicity of carboxylic acid groups.

The stabilisers can be included in an amount up to 8% by weight or higher, based on dry weight of monomer. More preferably the stabiliser is usually included in amounts of at least about 0.4%, and typically will be especially around 2 to 4%. This can improve the stability of the emulsion especially during a subsequent dehydration step if used.

The emulsified monomer is then subjected to polymerisation conditions to form a water in oil emulsion. The polymerisation may be effected by any suitable initiation technique, for instance using redox initiators. Thus in this case one half of the redox couple would be introduced into the monomer mixture. Thus the polymerisation conditions in this case would be by introducing the other half of the redox couple. Thus a reducing agent such as sodium sulphite can be introduced into the monomer mixture and then tertiary butyl hydroperoxide can be added to the emulsion in order to initiate polymerisation. One preferred method of initiating the polymerisation is to use a dual feed of initiators into the reaction mixture, We have found that this method enables the polymerisation process to be controlled more effectively and an this tends to yield a polymer with consistently improved rheology, moisture absorbence, adhesiveness and vapour transmission characteristics.

The water immiscible liquid is desirably an oil suitable for emulsion polymerisation. Preferably the water immiscible liquid is a hydrocarbon. Typically the liquid may be for instance as described in EP-A-150933. Typically the water immiscible may be a hydrocarbon fraction, mineral oil, hydrophobic ester, natural oil or silicone fluid. However, it may be desirable to use especially pure water immiscible liquids. For instance certain cleaning compositions may be used to clean hard surfaces used in medical or surgical environments. In addition this may be necessary when the composition is used in a an adhesive composition, for instance for a surgical dressing. Thus in this case it would be possible to use for instance a high purity medicinal grade white oil. A particularly preferred high purity medicinal grade white oil is Kristol M 14 (RTM).

Alternatively ultraviolet initiators can be introduced into the aqueous monomer solution prior to emulsification and then the emulsion can be subjected to polymerisation conditions by subjecting the emulsion to ultraviolet radiation. Other forms of suitable polymerisation conditions include heat.

Once polymerisation has been completed the thus formed emulsion may be further processed wherein the water in oil emulsion is dehydrated. The emulsion may for instance be subjected to vacuum distillation in order to remove some or substantially all of water present in the polymer. This can be achieved by a number of evaporation techniques involving a combination of high temperature and vacuum. One suitable process includes subjecting a thin film of the emulsion to an elevated temperature, for instance by use of a Luwa.

It is particularly preferred that the dispersed phase of the polymer composition has a volume average particle size in the range 200 nm to 1 micron. More preferably the particles are in the size range 350 nm to 750 nm, especially 400 or 500 to 700 or 750 nm.

Generally it is preferred that the dispersed phase consists of polymeric particles comprising at the surface an amphipathic polymeric stabiliser. We have found that polymer compositions comprising such particles are particularly effective in an aqueous cleaning composition. We have further found that polymer compositions comprising such particles are particularly effective in the adhesive composition.

The polymer composition may contain an activating surfactant, for instance containing repeating ethoxylate units. The activator may assist inversion of the water in oil composition. Suitable surfactants for this purpose are well known. Preferably the activating surfactant is non-ionic and exhibits an HLB value of greater than 10.

We have found that the polymer composition described above and/or the polymers obtainable by the above processes can be used in a cleaning composition. We have found that the cleaning composition exhibits surprisingly improved rheology characteristics.

Typically the polymer of the present invention may be used as a rheology modifier in an aqueous cleaning composition in an amount between 0.5 to 5% by weight.

Generally the cleaning compositions will desirably also include at least one water soluble surfactant to enhance the cleaning properties of the compositions.

Typically a cleaning composition comprising:

0.5% to 10% of a polymeric thickener
1% to 60% of abrasive particles and
0.5% to 15% of a bleaching agent.

If desired the composition may also comprise colloidal forming materials. Typically the preferred colloid forming materials are clays such as smectite clays, bentonite, laponite and montmorillonite.

In the compositions of the invention, the choice of abrasive particles is not limited and any suitable bleach stable particles of appropriate particle size and abrasivity may be used. Examples of suitable abrasive particles include calcium carbonate, pumice stone, calcite, dolomite, feldspar, talc, alumina, silica, quartz, perlite, zirconium silicate and diatomaceous earth and organic materials such as melamine, resins such as urea formaldehyde resins, polyethylene beads and polyamide derivatives. Calcium carbonate is particularly preferred.

In preferred compositions, the abrasive particles are present in amounts of 1% to 30%, particularly preferably 2% to 15%.

The bleaching agent employed in the compositions of the invention is preferably a halogen-based bleach. Suitable examples include hypohalite, especially hypochlorite salts of the alkali and alkaline earth metals, especially sodium hypochlorite or potassium hypochlorite, haloamines, haloimines, haloimides, haloamides, isocyanurate derivatives such as potassium or sodium dichloroisocyanurate, trichlorocyanuric acid, dichlorodimethyl hydantoin, chlorobromo dimethyl hydantoin, N-chlorosulphamide, chloramine an chlorinated trisodium phosphate dodecahydrate. Sodium hypochlorite is especially preferred.

The bleaching agent is preferably present in amounts of not more than 15%, particularly not more than 13% and, especially not more than 9%. The actual amount of bleaching agent will be determined in accordance with the amount of available chlorine which results. Hence, the above quoted amounts are for guidance only and the amount of bleaching agent required to provide a given amount of available chlorine can be determined by methods known to those skilled in the art. Typically, the level of available chlorine will be about 1%.

In addition to the above components, the compositions of the invention may further include surfactants in order to improve the cleaning properties of the composition. The surfactants must, of course, be bleach stable and will also desirably provide an additional contribution to the thickening system, by interaction with the colloid forming clay. Especially preferred are amine oxide type surfactants (which provide a useful level of foaming in use of the composition), and sodium lauryl sulphate. A preferred amine oxide surfactant which can be obtained under the trade name Aromox (™) from Akzo Nobel is a cocodimethylamine oxide. Sodium lauryl sulphate is obtainable from Albright & Wilson under the trade name Empicol.

Other surfactants and surfactant blends may also, or alternatively, be incorporated into the compositions of the invention, of which examples include alkyl ether sulphates, alkyl sulphates, dodecyl benzene sulphonate, paraffin sulphonates, xylene, cumene and toluene sulphonates, sulphosuccinates, carboxylate surfactants, carboxylic ether surfactants, alpha olefin sulphonates, carboxyamphoglycinates and derivatives thereof. These surfactants may generally be present in amounts of up to 10%, preferably up to 5% and especially 1% to 3%.

As is known in the art, the pH of a composition may have an effect on the particle size of particles in suspension, and hence on the stability of the suspension.

It has been hypothesised that the pH may affect the surface charge on the particles. Thus, at acidic pH the particles are protonated and carry a positive charge and the converse is true at alkaline pH. In the surface charged state, the particles are less likely to be flocculated. At intermediate pH values, the particles may reach a state of zero charge, at which the particles are more likely to agglomerate so that the average particle size increases and flocculation may occur.

In the present invention, it has been found that, where the abrasive particles are calcium carbonate, the calcium carbonate particles tend to flocculate at pH values of a liquid phase of less than about pH 5.5 and there is an increased tendency to flocculation at pH values of greater than about pH 12. In the case of a clay, it was found that flocculation of the clay particles begins to occur only at pH values greater than about pH 11. When the above two components are formulated in compositions of the invention together with the polymeric thickener, minimum particle sizes are found to occur at pH values of about pH 9 to pH 12, especially pH 10.5 to pH 11.5. In this respect therefore, it is desirable that the compositions of the invention are adjusted to a pH within the above range. However, consideration must also be given to optimising the viscosity and bleach stability and when these factors are taken into account, the preferred pH of the compositions of the invention is pH 13 to pH 14, particularly pH 13.4. Generally sodium hydroxide will be added to the composition in order to adjust the pH, but other suitable pH-adjusting materials, as known in the art, may be used. The addition of the sodium hydroxide also serves to increase the electrolyte concentration which can enhance the thickening capability of the polymeric thickener. The sodium hydroxide may be present, in amounts of 0 to 20%, particularly 1 to 10% and especially 1 to 4%.

The compositions of the invention can be adjusted to have a desired rheology by appropriate selection of the amounts of one or more of the sodium hydroxide, the clay and the acrylic polymer. Further, during formulation of the composition, increased stirring time will lead to an increase in viscosity. The compositions of the invention are thixotropic with a relatively low yield point. Thus, the compositions maintain a viscosity sufficient to suspend the abrasive particles whilst in storage prior to use and are shear thinning to allow ejection of the composition from the bottle in use. The compositions of the invention regain a high viscosity after ejection and are thus able to "cling to non-horizontal surfaces.

Further, the compositions of the invention spread well on a hard surface because of an excellent surface wettability. Surface wettability can be measured by the contact angle of the composition on the surface.

Other minor optional ingredients may also be present in the compositions of the invention, such as optical brighteners, dyes, pigments and perfumes. Optical brighteners such as titanium dioxide or other titanium derivatives may be present in amounts of up to 10%, preferably not more than 1%. Perfumes may be present in amounts of up to 1%, preferably up to 0.5%.

The composition of the present invention may also be used advantageously to thicken a variety of aqueous liquids, such as print pastes, aqueous emulsion paints and fabric conditioners and the like.

In addition we have found that the polymer composition described above and/or the polymers obtainable by the above processes can be used in an adhesive composition for a dressing to be applied to animal or human skin. Preferably the adhesive composition is used in a medical/surgical/wound dressing. We have surprisingly found that the adhesive composition has surprisingly improved moisture absorption, breathability and adhesion properties.

The dressings may be any dressings normally applied to human or animal skin. The adhesive composition may be any compoistion suitable for affixing dressings to animals/human skin. The adhesive composition may also contain other ingredients, for instance therapeutic ingredients. Thus the adhesive composition may be as defined in U.S. Pat. No. 6,171,594, incorporated herein by reference.

We have found that the polymer composition has other advantages when used in medical dressings. For instance we found that the polymer can be used to control the delivery of medicaments to the skin. Thus the polymer composition can be used the uses described in U.S. Pat. No. 6,153,215.

The following example illustrates the invention.

EXAMPLE

An aqueous monomer phase is prepared by admixing 67.6 gms glacial acrylic acid, 192.3 gms deionised water, 0.6 gms of Diethylene triamine penta acetic acid sodium salt, 59.5 gms of NN' Dimethyl acrylamide and 80. gms of sodium hydroxide solution (47%) together with 250 ppm crosslinking monomer (based on weight of total monomer).

Seperately an oil phase is prepared by admixing 14.0 grams of sorbitan mono oleate, 60.0 grams of an amphipathic stabiliser, 115.2 grams of a water immiscible liquid and 170.7 grams of a hydrocarbon distillate fraction.

The two phases are homogenized together to form a water-in-oil emulsion of typical average particle size 200–1000 nm.

The emulsion is then deoxygenated before polymerization is effected using a redox initiator pair of tertiary butyl hydroperoxide and sodium metabisulphite. When the polymerization is complete water and hydrocarbon are removed by distillation before addition of an inverting surfactant.

The polymer can be inverted in water to form an aqueous dilution, which can be used in the same manner as state of the art rheology modifiers for cleaning compositions.

The polymer composition thus formed exhibits improved rheology characteristics in aqueous cleaning compositions by comparison the equivalent composition with a state of the art rheology modifiers.

In addition the polymer can be inverted in water to form an aqueous dilution, which can be used in the same manner as state of the art MVTR additives for adhesive compositions for dressings and given in any on the references referred to herein.

The polymer composition thus formed can be used alone or as component of an adhesive composition for a dressing where it exhibits high moisture vapour transmission rates, moisture absorption. The adhesive composition also exhibits greater adhesiveness by comparison the equivalent composition with a state of the art MVTR additive.

The invention claimed is:

1. A skin adhesive composition which comprises a continuous phase comprising a water immiscible liquid and a dispersed phase comprising a polymer of an N-substituted acrylamide and ethylenically unsaturated acid or salt and optionally a cross-linking agent wherein the polymer is substantially anhydrous.

2. A composition according to claim 1 in which the polymer comprises from 10 to 90 weight % N-substituted acrylamide and from 10 to 90 weight % of an ethylenically unsaturated acid or salt and optionally a cross-linking agent.

3. A composition according to claim 1 in which the polymer comprises from 30 to 90 weight % N-substituted acrylamide and from 10 to 70 weight % of an ethylenically unsaturated acid or salt and optionally a cross-linking agent.

4. A composition according to claim 1 in which the N-substituted acrylamide is selected from the group consisting of N-methyl acrylamide, N-ethyl acrylamide, N-propyl acrylamide, N,N-dimethyl acrylamide, N,N-diethyl acrylamide, N,N-dipropyl acrylamide and diacetone acrylamide.

5. A composition according to claim 1 in which the ethylenically unsaturated acid is selected from the group consisting of acrylic acid, methacylic acid, maleic acid, itaconic acid, fumaric acid, allyl sulphonic acid, vinyl sulphonic acid and 2-acrylamido-2-methylpropane sulphonic acid, wherein the acid is a free acid or an ammonium or alkali metal salt thereof.

6. A composition according to claim 1 in which the polymer is formed from monomers consisting of N,N-dimethyl acrylamide, (meth)acrylic acid (or ammonium or alkali metal salt) and optionally a cross-linking agent.

7. A composition according to claim 1 in which the dispersed phase has an average particle size in the range 200 nm to 1 micron.

8. A composition according to claim 1 in which the dispersed phase comprises polymeric particles wherein an amphipathic polymeric stabilizer is at the surface of the polymeric particle.

9. A composition according to claim 1 in which the water immiscible liquid is selected from the group consisting of a hydrocarbon, a silicone oil, hydrophobic ester, a natural oil and a mineral oil.

10. A composition according to claim 1, which composition is free of an activator surfactant.

11. A process of making a composition defined by claim 1 comprising the steps of emulsifying into a water immiscible liquid, an aqueous solution of the monomer optionally containing polymerisation initiators and wherein the water immiscible liquid contains an amphipathic polymeric stabilizer and subjecting the monomer to polymerisation conditions to form a water in oil emulsion and removing substantially all the water present in the polymer.

12. A process according to claim 11 in which the water in oil emulsion is subjected to vacuum distillation in order to remove substantially all of water present in the polymer.

* * * * *